No. 769,305. Patented September 6, 1904.

UNITED STATES PATENT OFFICE.

EMILE DAVÈNES, OF SIERRA MADRE, CALIFORNIA.

COMPOSITION OF MATTER.

SPECIFICATION forming part of Letters Patent No. 769,305, dated September 6, 1904.

Application filed July 13, 1903. Serial No. 165,406. (No specimens.)

*To all whom it may concern:*

Be it known that I, EMILE DAVÈNES, a citizen of the United States, residing at Sierra Madre, in the county of Los Angeles and State of California, have invented new and useful Improvements in Compositions of Matter, of which the following is a specification.

My invention relates to a composition of matter useful in making an improved wrapper for preserving fruit; and the object thereof is to produce a wrapper with which to inclose the fruit, and thereby retard the decay therein, particularly while the fruit is being transported from one place to another and also while the same is packed in the warehouse or fruit-store.

It is well known that a great loss is sustained by fruit-growers by failure of the railroad companies to properly care for the fruit while in transit and to furnish rapid transportation. The failure of trainmen to properly ventilate the cars containing the fruit and the delay in transmission results in a large percentage of loss due to rotting and other defects. This is particularly true in transcontinental shipments; and the present method has been devised to reduce the loss without materially increasing the expense of transportation, particularly when considered from a comparative standpoint in relation to the loss or decay of fruit heretofore occurring.

As is well known, many fruits, as oranges, lemons, grape-fruit, and the like, have an outer rind which is very porous and full of volatile oil, and an interior coating of spongy matter which has a great affinity for moisture, and if the oil evaporates the atmospheric air and moisture will readily strike through said rind and be absorbed by the interior spongy matter, the result being that the rind will mold and cause the fruit to ferment and spoil. Something further is essential besides the mere exclusion of air and moisture from fruit and vegetables. It is necessary to prevent the evaporation of the volatile oils in the rind of the fruit and also necessary to preserve the acid in the fruit, so that when the latter is finally exposed to the air it will not readily invite decay, but will retain its weight, solidity, flavor, and acidity as long as it would have done if just plucked and not wrapped. It has been found that the use of a wrapper prepared according to the improved process or method hereinafter explained is conducive in producing the desirable results just enumerated.

In the preparations of my improved composition of matter for preparing a fruit-wrapper I dissolve one pound of hydrate of potash in three gallons of boiling water and then add one quart of cotton-seed or other vegetable oil and ten pounds of animal fat and boil the mixture until the ingredients are thoroughly commingled, after which I add one pound of cocoa-butter, preferably in a melted state, and one pound of petrolatum, preferably in a melted state. These ingredients are thoroughly mixed by ebullition produced by boiling the same, after which I add one-quarter of a pint of nitric acid and boil the combined mixture until thoroughly mixed. Pieces of paper of suitable dimensions to fully inclose the fruit are dipped in the mixture, and when sufficiently cool each piece of fruit is wrapped in one of these prepared pieces of paper, the same being secured thereto in a suitable manner. The fruit so incased is then packed in suitable boxes or cases with suitable packing material. The paper so treated prevents the entrance of air to the fruit and also obstructs the evaporation of the oils contained in the rind of citrus fruits, and fruits so incased will be preserved thereby from decay a much longer time than if packed in unprepared fruit-wrappers.

Having described my invention, what I claim as new, and desire to secure by Letters Patent, is—

The herein-described process of making a composition of matter which consists in dissolving one pound of hydrate of potash in three gallons of water and then adding one quart of vegetable oil and ten pounds of animal fat and thoroughly mixing the same, and to the mixture adding one pound of cocoa-butter and one pound of petrolatum and thoroughly mixing by boiling, after which adding one-quarter of a pint of nitric acid and then mixing the same.

In witness that I claim the foregoing I have hereunto subscribed my name this 6th day of July, 1903.

EMILE DAVÈNES.

Witnesses:
G. E. HARPHAM,
H. C. NICKELESON.